(12) United States Patent
Kim et al.

(10) Patent No.: US 10,772,150 B2
(45) Date of Patent: *Sep. 8, 2020

(54) METHOD AND APPARATUS OF MANAGING STORED SYSTEM INFORMATION USING VALIDLY TIMER WHEN APPLYING DISCONTINUOUS RECEPTION MODE IN MOBILE COMMUNICATION SYSTEM

(71) Applicant: Samsung Electronics Co., Ltd, Suwon-si (KR)

(72) Inventors: Soenghun Kim, Suwon-si (KR); Himke Van Der Velde, Zwolle (NL); Sangbum Kim, Suwon-si (KR); Jaehyuk Jang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/200,346

(22) Filed: Nov. 26, 2018

(65) Prior Publication Data

US 2019/0098690 A1    Mar. 28, 2019

Related U.S. Application Data

(63) Continuation of application No. 15/236,376, filed on Aug. 12, 2016, now Pat. No. 10,143,034.

(Continued)

(51) Int. Cl.
*H04W 76/28*    (2018.01)
*H04W 4/70*    (2018.01)
(Continued)

(52) U.S. Cl.
CPC ............. *H04W 76/28* (2018.02); *H04W 4/70* (2018.02); *H04W 48/16* (2013.01); *H04W 48/12* (2013.01); *H04W 88/08* (2013.01)

(58) Field of Classification Search
CPC ....... H04W 76/20; H04W 76/28; H04W 4/70; H04W 48/10; H04W 48/12; H04W 48/16; H04W 88/08
See application file for complete search history.

(56) References Cited

U.S. PATENT DOCUMENTS

2009/0253422 A1    10/2009    Fischer
2009/0318142 A1    12/2009    Choi et al.
(Continued)

FOREIGN PATENT DOCUMENTS

CN    101317347 A    12/2008
CN    101341673 A    1/2009
(Continued)

OTHER PUBLICATIONS

International Search Report dated Nov. 23, 2016 in connection with International Patent Application No. PCT/KR2016/008907, 3 pages.
(Continued)

*Primary Examiner* — Paul H Masur

(57) ABSTRACT

A method for managing system information using a valid period timer includes receiving system information from a base station, checking whether information related to the management of a valid timer time regarding system information is included in the system information, and determining the valid timer time regarding the system information according to the checking result, and starting a timer by employing the determined valid timer time and managing the system information. A terminal including a controller configured to control the transceiver to receive system information from a base station, check whether information related to management of a valid timer time regarding system information is included in the system information, determine the valid timer time regarding the system information according to the checking result, start a timer set for
(Continued)

the determined valid timer time, and manage the system information.

20 Claims, 8 Drawing Sheets

Related U.S. Application Data

(60) Provisional application No. 62/204,315, filed on Aug. 12, 2015.

(51) Int. Cl.
*H04W 48/16* (2009.01)
*H04W 88/08* (2009.01)
*H04W 48/12* (2009.01)

(56) References Cited

U.S. PATENT DOCUMENTS

| | | | |
|---|---|---|---|
| 2011/0199950 A1 | 8/2011 | Klingenbrunn et al. | |
| 2011/0256858 A1* | 10/2011 | Wu | H04W 48/10 455/422.1 |
| 2013/0258938 A1 | 10/2013 | Sagfors et al. | |
| 2014/0233471 A1 | 8/2014 | Kim et al. | |
| 2015/0181557 A1* | 6/2015 | Kitazoe | H04W 48/12 455/421 |
| 2015/0195782 A1 | 7/2015 | Terry et al. | |
| 2015/0223258 A1 | 8/2015 | Jung et al. | |
| 2016/0029261 A1 | 1/2016 | Jang et al. | |
| 2016/0044714 A1 | 2/2016 | Kim et al. | |
| 2016/0165638 A1 | 6/2016 | Ozturk et al. | |
| 2016/0192323 A1 | 6/2016 | Kim et al. | |
| 2016/0234736 A1 | 8/2016 | Kubota et al. | |
| 2017/0086131 A1* | 3/2017 | Gupta | H04W 48/14 |
| 2018/0124685 A1 | 5/2018 | Jha et al. | |
| 2018/0139625 A1 | 5/2018 | Breuer et al. | |
| 2018/0139687 A1 | 5/2018 | Breuer et al. | |
| 2018/0146416 A1 | 5/2018 | Breuer et al. | |
| 2018/0234917 A1 | 8/2018 | Kim | |

FOREIGN PATENT DOCUMENTS

| | | |
|---|---|---|
| CN | 101572934 A | 11/2009 |
| CN | 101827381 A | 9/2010 |
| EP | 2493223 A1 | 8/2012 |
| KR | 10-2015-0016179 A | 2/2015 |
| KR | 10-2015-0018531 A | 2/2015 |
| WO | 2014/168427 A1 | 10/2014 |
| WO | 2015/113688 A1 | 8/2015 |

OTHER PUBLICATIONS

Rapporteur (Samsung), "Miscellaneous editorial corrections", 3GPP TSG-RAN2 Meeting #67, Shenzhen, P.R. China, Aug. 24-28, 2009, 199 pages, R2-094961.
Motorola, "System Information Change during Connection Setup Procedure", 3GPP TSG-RAN WG2#63, Jeju, Korea; Aug. 18-22, 2008, 14 pages, R2-084212.
Ericsson, "Procedure requirements for ETWS primary notification with security", 3GPP TSG RAN WG2, San Francisco, CA, USA, May 4-8, 2009, 46 pages, R2-092882.
Samsung, "Clarifications and corrections on system information", 3GPP TSG-RAN2#63bis Meeting, Prague, Czech Republic, Sep. 29-Oct. 3, 2008, 8 pages, R2-085899.
Alcatel-Lucent, "[79bis#27] LTE/feICIC, SIB1 provisioning via dedicated signalling", 3GPP TSG RAN WG2 Meeting #80, New Orleans, USA, Nov. 12-16, 2012, 19 pages, R2-125645.
Extended European Search Report and European Search Opinion dated Apr. 24, 2018 in connection with European Patent Application No. 16835485.0, 11 pages.
Nokia Networks, "Initial considerations on solutions for improving coverage of the PCCH channel", 3GPP TSG-RAN WG1 Meeting #80, Feb. 9-13, 2015, R1-150640, 3 pages.
Ericsson, "Broadcasting access control actions for NW assigned groups", 3GPP TSG-RAN WG2 Meeting #85bis, Mar. 31-Apr. 4, 2014, R2-141271, 6 pages.
Samsung, "RRC signalling support for SIB-1 acquisition in FeICIC", 3GPP TSG-RAN2#79 meeting, Aug. 12-18, 2012, Tdoc R2-123582, 3 pages.
Samsung, "SI update in the extended IDLE DRX", 3GPP TSG RAN WG2 #91, Aug. 24-28, 2015, R2-153440, 4 pages.
European Search Report dated Dec. 5, 2019 in connection with European Patent Application No. 19 19 7516, 12 pages.
HTC, "Clarification on System Information validity time", Change Request, 3GPP TSG-RAN WG2 Meeting #78, May 21-25, 2012, R2-122487, 4 pages.
Office Action dated Apr. 24, 2020 in connection with Chinese Patent Application No. 201680047597.2, 21 pages.

* cited by examiner

METHOD AND APPARATUS OF MANAGING STORED SYSTEM INFORMATION USING VALIDLY TIMER WHEN APPLYING DISCONTINUOUS RECEPTION MODE IN MOBILE COMMUNICATION SYSTEM

CROSS-REFERENCE TO RELATED APPLICATIONS

The present application is a continuation of U.S. patent application Ser. No. 15/236,376 filed on Aug. 12, 2016, which claims priority under 35 U.S.C. § 119 to U.S. Provisional Patent Application No. 62/204,315 filed on Aug. 12, 2015, the disclosures of which are herein incorporated by reference in their entirety.

BACKGROUND

1. Field

The present disclosure relates to a method of managing system information in discontinuous reception mode in a mobile communication system, and more particularly to a method of managing system information using a valid period timer.

2. Description of Related Art

In order to meet the increase in the demand for wireless data traffic after the commercialization of 4G communication systems, considerable effort has been made to develop pre-5G communication systems or improved 5G communication systems. This is one reason why '5G communication systems' or 'pre-5G communication systems' are called 'beyond 4G network communication systems' or 'post LTE systems.' In order to achieve a high data transmission rate, 5G communication systems are being developed to be implemented in a band of extremely high frequency, or millimeter wave (mmWave), e.g., a band of 60 GHz. In order to reduce the occurrence of stray electric waves in a band of extremely high frequency energy and to increase the transmission distance of electric waves in 5G communication systems, various technologies being explored, for example: beamforming, massive MIMO, Full Dimensional MIMO (FD-MIMO), array antennas, analog beam-forming, large scale antennas, etc. In order to improve system networks for 5G communication systems, various technologies have been developed, e.g., evolved small cell, advanced small cell, cloud radio access network (cloud RAN), ultra-dense network, Device-to-Device communication (D2D), wireless backhaul, moving network, cooperative communication, Coordinated Multi-Points (CoMP), interference cancellation, etc. In addition, for 5G communication systems, other technologies have been developed, e.g., Hybrid FSK and QAM Modulation (FQAM) and Sliding Window Superposition Coding (SWSC), as Advanced Coding Modulation (ACM), Filter Bank Multi Carrier (FBMC), non-orthogonal multiple access (NOMA), sparse code multiple access (SCMA), etc.

The Internet has evolved from a human-based connection network, where humans create and consume information to the Internet of Things (IoT) where distributed configurations, such as objects, exchange information with each other to process the information. The technology related to the IoT is starting to be combined with, for example, technology for processing big data through connection with a cloud server, and this is called an Internet of Everything (IoE) technology.

In order to manifest the IoT, various technical components are required, such as, a sensing technology, wired/wireless communication and network infra technology, a service interfacing technology, a security technology, etc. In recent years, a sensor network for connecting objects, Machine to Machine (M2M), Machine Type Communication (MTC), etc. have been researched. In the IoT environment, intelligent Internet Technology (IT) services may be provided to collect and analyze data acquired from objects connected to each other and thus a create new value for human life. As existing information technologies are fused and combined with various industries, the IoT may also be applied within various fields, such as: smart homes, smart buildings, smart cities, smart cars or connected cars, smart grids, health care, smart home appliances, high quality medical services, etc.

Various attempts have been made to apply 5G communication systems to the IoT network. For example, various technologies related to sensor networks, Machine to Machine (M2M), Machine Type Communication (MTC), etc., have been implemented by beam-forming, MIMO, array antenna, etc., as 5G communication technology. The application of the cloud RAN as a big data processing technology described above may be an example of a hybrid of 5G technology and IoT technology.

As such, in order to satisfy the demand for wireless data traffic, people in various fields are discussing the development of communication methods, e.g., device-to-device communication (D2D), a frequency aggregation system for a number of cells, a multiple antenna system using large scale antennas, etc.

SUMMARY

To address the above-discussed deficiencies, it is a primary object to provide a method and apparatus for managing system information, using a valid period timer, in discontinuous reception mode, in a mobile communication system.

In accordance with an aspect of the present disclosure, a method for a terminal to manage system information in a mobile communication system is provided. The method includes: receiving system information from a base station; checking whether information related to the management of a valid time regarding system information is included in the system information, and determining a valid time regarding the system information according to the checking result; and starting a timer by employing the determined valid time (validity timer) and managing the system information.

In accordance with another aspect of the present disclosure, a method for a base station to transmit system information in a mobile communication system is provided. The method includes: determining whether the base station includes information related to the management of a valid time regarding system information in the system information, in order to determine the valid time; and transmitting the system information to a terminal so that the terminal starts a timer by employing the valid time (validity timer) determined according to the determination as to whether information related to the management of a valid time is included in the system information.

In accordance with another aspect of the present disclosure, a terminal configured to manage system information in a mobile communication system is provided. The terminal includes: a transceiver for performing the transmission/reception of signals; and a controller for: controlling the reception of system information from a base station; checking whether information related to the management of a valid time regarding system information is included in the system information; determining a valid time regarding the system information according to the checking result; starting a timer by employing the determined valid time (validity timer); and managing the system information.

In accordance with another aspect of the present disclosure, a base station configured to transmit system information in a mobile communication system is provided. The base station includes: a transceiver for performing the transmission/reception of signals; and a controller: determining whether the base station includes information related to the management of a valid time regarding system information in the system information, in order to determine the valid time; and transmitting the system information to a terminal so that the terminal starts a timer by employing the valid time (validity timer) determined according to the determination as to whether information related to the management of a valid time is included in the system information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

Embodiments of the present disclosure are described in detail referring to the accompanying drawings. Detailed descriptions of well-known functions and structures incorporated herein may be omitted to avoid obscuring the subject matter of the disclosure. The terms or words described in this description and the claims should not be limited by a general or lexical meaning, instead should be analyzed as a meaning and a concept through which the inventor defines and describes the disclosure to the best of his/her ability, to comply with the idea of the disclosure.

Although the following embodiments are described based on Long Term Evolution (LTE) systems and LET-Advanced (LTE-A) systems, it will be appreciated to those skilled in the art that the subject matter of the present disclosure can also be applied to various types of communication systems using discontinuous reception (DRX) mode.

Figure 1:
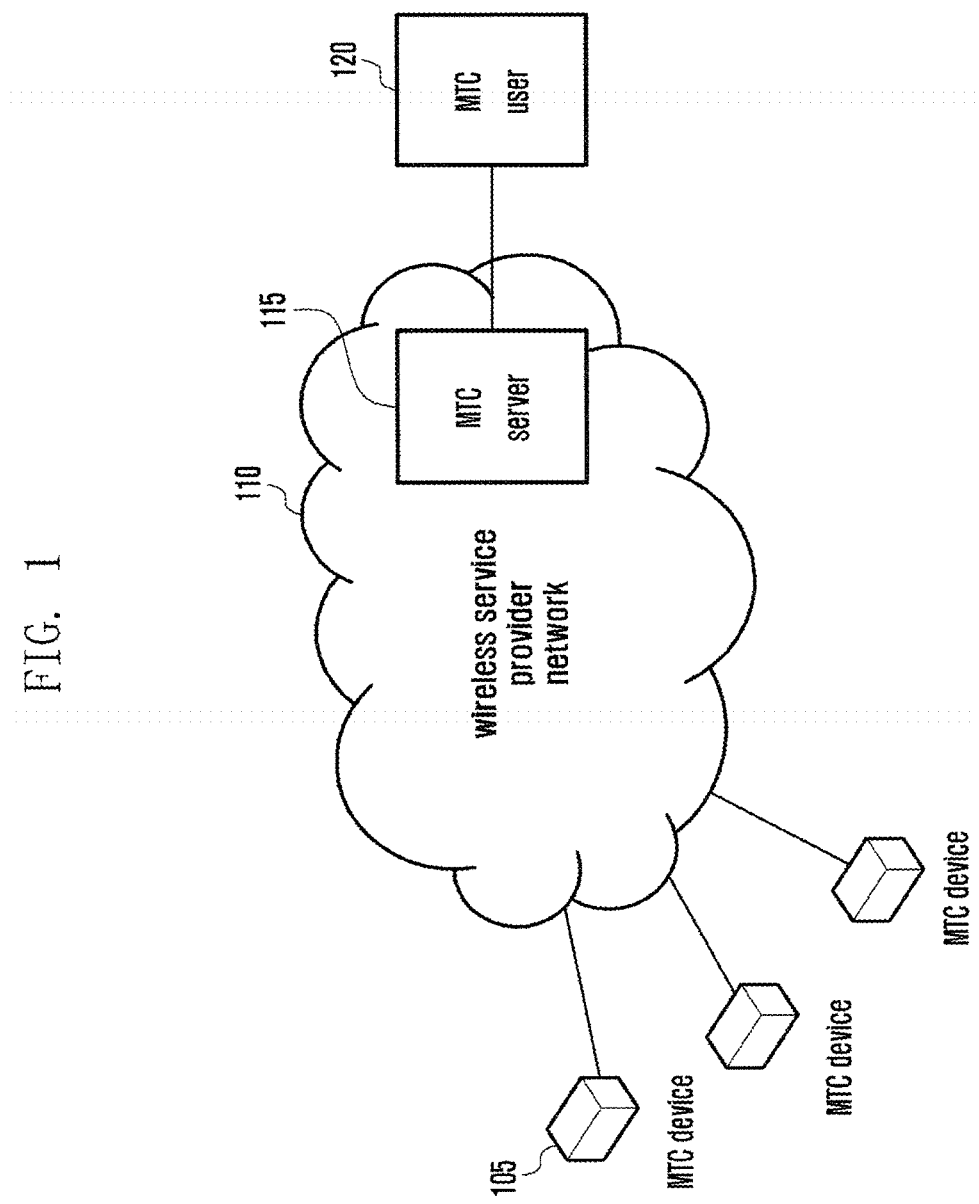
FIG. 1 is a diagram that describes a communication scenario in machine-type communication (MTC)

FIG. 1 is a diagram that describes a communication scenario in machine-type communication (MTC).

Machine-type communication (MTC) devices 105 are connected to a wireless service provider network 110. MTC devices 105 can refer to various unmanned/automated machines, such as meters, vending machines, etc. MTC devices 105 have features that differ from existing wireless terminals in terms of various aspects. The features of MTC devices can vary according to the types. A number of MTC devices with various features can exist in one cell.

The MTC server 115 has information regarding MTC devices 105 and performs authentication. The MTC server 115 collects information from the MTC devices 105, and transmits the collected information to the MTC user 120. The MTC server 115 can be inside or outside the wireless service provider network. The MTC user 120 refers to an end user that needs information that the MTC devices transmitted.

Machine-type communication (MTC) has features that differ from those of existing wireless communication. The features of MTC are classified into various categories according to use purpose. For example, when MTC devices need communication only a few times a day regardless of time, they are 'Time Tolerant.' When MTC devices are installed at a site and perform the collection and transmission of specified information, they are 'low mobility.' Wireless service providers need to provide services, considering various types of features of MTC and the coexistence with existing terminals.

In particular, MTC devices, related to the tracking of animals, freight vehicles, etc., are equipped with a battery or a self-powered system. Since these types of MTC devices must use limited power, it is preferable that they need to be designed to consume an extremely small amount of power, efficiently. WG SA1 in the 3GPP has defined an extra low power consumption mode where MTC devices can be set to consume low power.

Increasing a discontinuous reception (DRX) cycle is one of the methods of reducing power consumption. User equipment (UE) performs the reception to receive a paging signal from an eNB. Paging signals are not signals frequently transmitted from eNBs. When UE performs the reception to receive a paging signal during a period time when it does not arrive, it causes power consumption.

In order to reduce power consumption, UE is capable of performing the reception operation and making an attempt to receive a paging signal for only a specified time interval periodically, and this is called discontinuous reception (DRX). In LTE system, UE devices in an idle state perform the DRX operation describe as in the following Equation 1. The system frame number (SFN) per radio frame increases by one. When a paging signal is transmitted via a radio frame satisfying the equation, UE performs the reception operation based on DRX. The radio frame is called Paging Frame (PF).

$$\text{SFN mod } T = (T \text{ div } N)*(UE\_ID \text{ mod } N) \qquad \text{[Equation 1]}$$

where

SFN: System Frame Number. 10 bits (MSB 8 bits explicit, LBS 2 bits implicit)

T: DRX cycle of the UE. Transmitted on SIB2. ENUMERATED {rf32, rf64, rf128, rf256}

N: min (T, nB)

nB: Transmitted on SIB2. ENUMERATED {4T, 2T, T, T/2, T/4, T/8, T/16, T/32}

UE_ID: IMSI mod 1024 (IMSI is a unique number assigned to UE)

8 bits of Master Information Block (MIB) of Physical Broadcast Channel (PBCH) represent SFN. T and nB refer to values that are contained in System Information Block Type2 (SIB2) provided by an eNB. T can be one of the values, rf32, rf64, rf128, and rf256. For example, r32 refers to the length of a 32 radio frame. That is, r32 is 320 ms.

Figure 2:
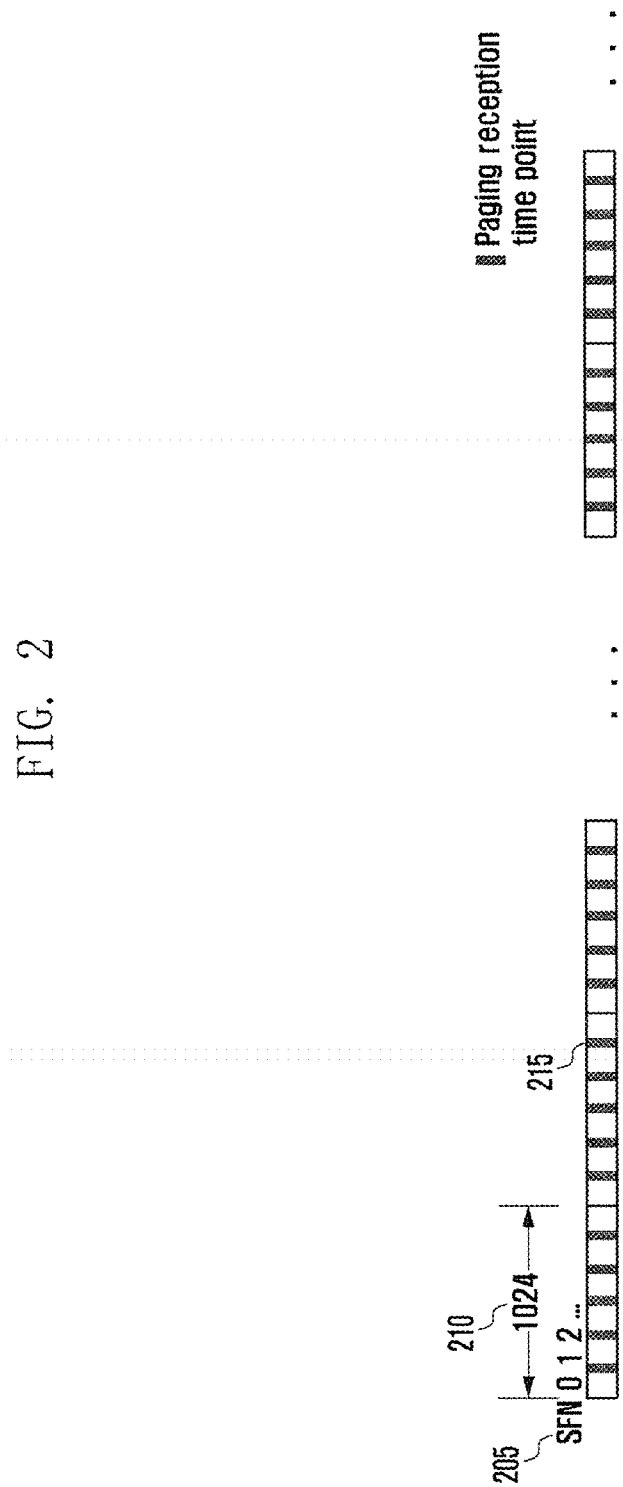
FIG. 2 is a diagram that describes the concept of a paging time point in the long term evolution (LTE) technology.

FIG. 2 illustrates the example concept of a paging time point in the long term evolution (LTE) technology.

The SFN increases by one every radio frame, as indicated by reference number 205. The SFN has a cycle of 1024, and is set to '0,' as indicated by reference number 210. Based on Equation 1, a paging message of the same pattern repeats every SFN cycle as indicated by reference number 215. From Equation 1, the maximum DRX cycle in the current LTE standard is 2.56 seconds. Although the DRX cycle increases to the maximum, it cannot exceed the SFN cycle, i.e., 10.24 seconds. That is, in order to reduce power consumption, the DRX cycle increases to greater than or equal to 10.24 seconds and simultaneously the SFN cycle also needs to increase. In order to increase the SFN cycle, the present disclosure includes additional SFN bits in an existing or new system information block (SIB) and defines the operations of UE receiving the SIB. The number of SFN bits increases by one every SFN cycle. The SIB including SFN bits does not need to be received by all UE devices. Only UE using a relatively long DRX cycle attempts to perform the reception operation.

systemInfoValueTag value (one IE included in SIB1), which increases by one each time that SIB information is altered, and systemInfoModification IE, which is included in pages and indicates a condition as to whether SI has been altered, are not affected from the change in the value of SFN bits. That is, although the value of SFN bits is altered, the systemInfoValueTag IE is not updated and the systemInfoModification IE is not transmitted via a paging operation.

In the embodiment, in order to extend the DRX cycle and simultaneously increase the success probability of receiving paging signals, it is assumed that attempts to receive a paging signal are performed a number of times for a preset DRX interval. To this end, a paging time point is determined by the following two steps.

1) Step 1: determine an SFN cycle during which a paging for an MTC device will occur.

2) Step 2: determine a radio frame that will occur during the SFN cycle determined at step 1.

At step 1, an SFN cycle during which a paging will occur is determined. The value of added SFN bits increases by one every one SFN cycle. The value of added SFB bits is defined as Hyper SFN (HFN). SFN cycles during which a paging will occur are acquired by the following Equation 2. In the present disclosure, a corresponding SFN cycle is called a Paging Hyper Frame (PHF).

$$\text{HFN mod } T' = (T' \text{ div } N')*(UE\_ID \text{ mod } N') \qquad \text{[Equation 2]}$$

where

N': min (T', nB')

UE_ID: IMSI mod 1024 (or MTC device group ID mod 1024)

Where T' and nB' refers to values provided by an eNB. T' and nB' can be included in SIB 2, along with existing T and nB. UE_ID can be derived through an IMSI module operation the same as general UE. Since MTC devices can be represented as devices of a group ID form, they can also employ a group ID. After determining SFN cycles during which a page will occur, a radio frame where a paging will occur during a corresponding SFN cycle is determined at step 2. The determination of a radio frame can be implemented with Equation 1.

When a time point when a paging will occur is defined via the two steps described above and thus MTC devices have a corresponding DRX cycle, power consumption can be greatly reduced. In addition, since the paging according to the setup of T and nB can repeat during the SFN cycle determined at step 1, the probability of receiving a paging can increase, which is advantageous.

Figure 3:
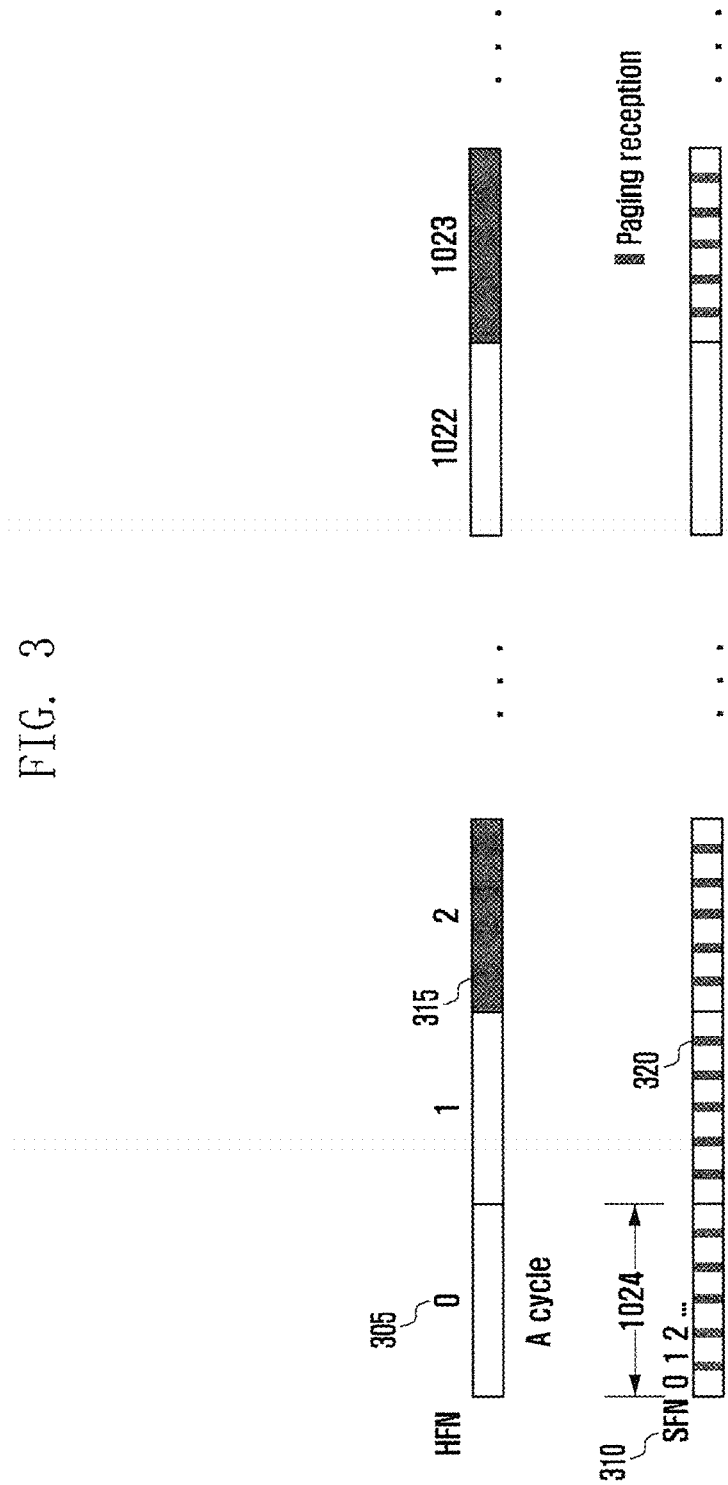
FIG. 3 is a diagram that describes the concept of a time point when paging occurs according to the present disclosure.

FIG. 3 illustrates an example concept of a time point when paging occurs according to the present disclosure.

An HFN increases by one every SFN cycle, indicated by reference number 305. An SFN cycle during which a paging will occur, indicated by reference number 310, is determined according to Equation 2. An SFN increases by one every radio frame, indicated by reference number 315. An eNB is capable of creating a paging via Equation 3 during the SFN cycle determined via Equation 2, as indicated by reference number 320.

Figure 4:
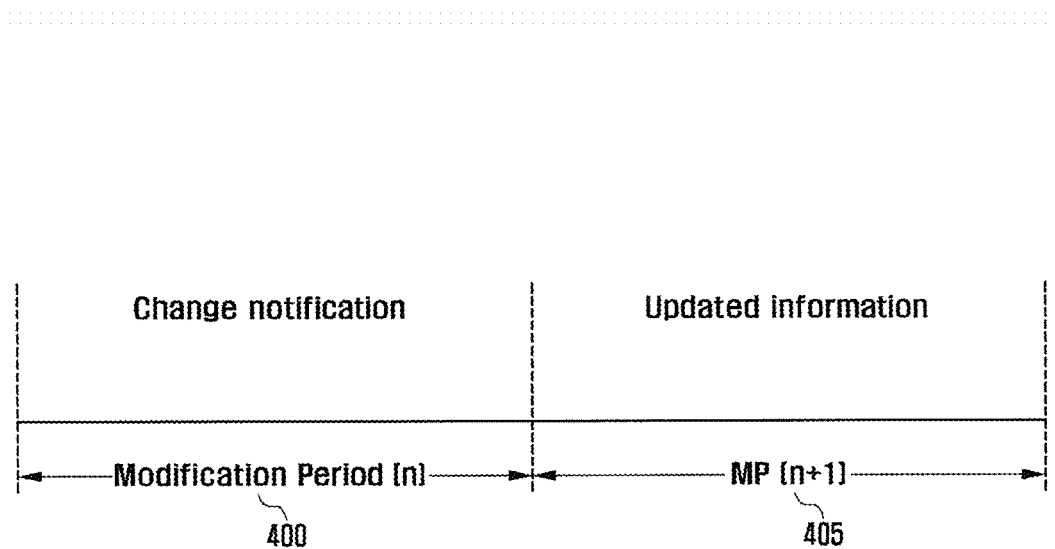
FIG. 4 is a diagram that describes a method of altering system information in the LTE technology.

FIG. 4 illustrates an example operation of altering system information in the LTE technology.

The system information broadcast by an eNB is altered based on a modification period (MP). An eNB is capable of broadcasting newly altered system information, except for part of the system information, from a time point that every modification period starts.

An eNB is capable of notifying UE devices, in a modification period (previous modification period) before broadcasting newly altered system information, that it will broadcast the newly altered system information from the next modification period. For example, when an eNB broadcasts system information from the n+1th modification period 405, it notifies UE devices in the nth modification period that system information has been altered. To this end, the eNB uses a paging message to notify UE of the alternation of system information, and UE needs to receive a paging message at least once during the modification period.

When systemInfoModification IE is included in a paging message, this means that newly updated system information is transmitted from the next modifications period following the modification period during which the paging message has been transmitted. When system information, except for part of the system information, is altered, systemInfoValueTag value included in SIB1 also increases by one. UE, camped on again from the out-of coverage, can use the paging message to determine whether its stored system information is identical to system information that is currently broadcast from an eNB.

UE can be implemented in such a way as to determine whether system information is altered, using systemInfoValueTag of an SIB1 or a paging message. When a DRX cycle is extended to be greater than the maximum of a modification period in order to reduce power consumption, UE may not receive a paging during the period. In this case, UE cannot determine whether system information is updated. In order to resolve the problem, a solution is needed.

The present disclosure provides a method capable of determining whether system information is updated when a DRX cycle is extended to be greater than the maximum of a modification period in order to reduce power consumption. When system information (SI) is updated, the SI update needs to be notified to all UE devices in an idle mode. The notification of SI update is performed via a paging message. Since an eNB does not know whether UE in an idle mode exists within the coverage area, it transmits paging message via all available PO, during the modification period.

In LTE standard, a modification period is an integer multiple of a default DRX cycle. On the other hand, the Extended DRX (eDRX) has a length of a DRX cycle, reaching tens of minutes. In order to notify UE using the eDRX of a condition as to whether system information is updated, the continuous transmission of a paging message can be performed over the overall duration of a DRX cycle. However, this operation leads to an excessive waste of radio resources.

An existing system information (SI) updating method applied to general DRX UE is the pre-notification. Therefore, when the DRX UE detects the presence of SI update, it performs the SI refresh in the next modification period (MP). The present disclosure checks a SIB1 for eDRX UE, in part of the HF after the time point that SI update occurs, and determines whether the SI is updated. That is, the existing SI updating method applied to eDRX UE is the post-notification. Therefore, when the eDRX UE detects the presence of SI update, it needs to perform the SI refresh.

When SI is updated during the MP [m+1], the eNB transmits a paging message for legacy DRX UE via all available PS of all available PF during the MP [m]. However, the eNB does not transmit an additional paging message for the eDRX UE. Instead, the eDRX UE acquires MIB and SIB1 at every PHF, and detects systemInfoValueTag information in the SIB 1. A precise time point can be acquired by the following plans.

Figure 5:
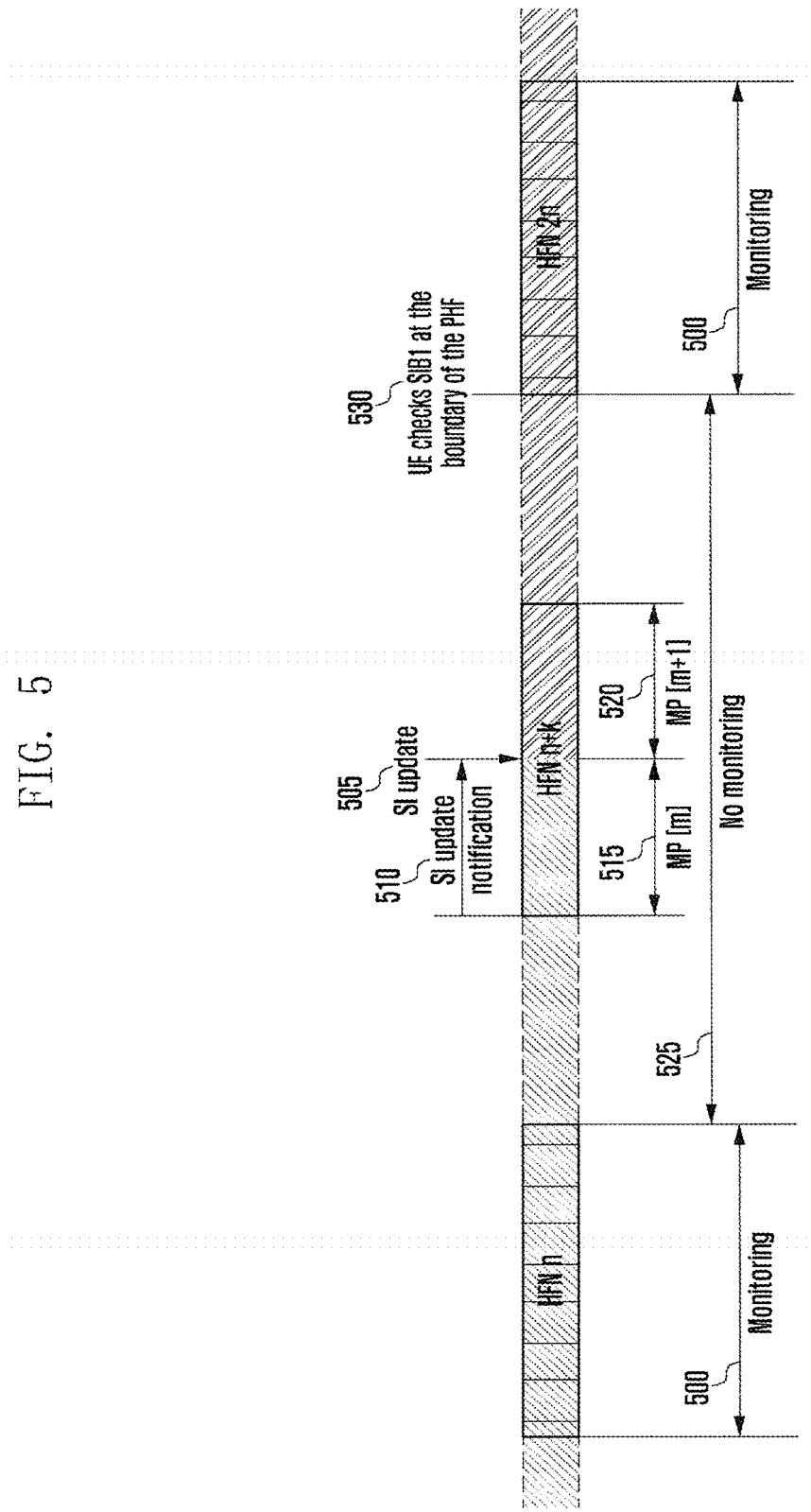
FIG. 5 is a diagram that describes a method of notifying user equipment (UE) of altered system information using SIB1 according to the present disclosure.

Plan 1: acquire SIB1 and the first MIB of PHF
Plan 2: acquire SIB1 and MIB closest to the first PF/PO of PHF FIG. 5 illustrates an example operation of notifying user equipment (UE) of altered system information using SIB1 according to the present disclosure.

UE employing the eDRX monitors a paging in only the PHF, based on a Hyper SFN, as indicated by reference number 500. In the PHF, UE can receive a paging from the PF/PO derived by applying existing or additional DRX parameters. SI update, indicated by reference number 505, can occur in a time interval 525, not in the PHF. When SI updated from and after the m+1$^{th}$ MP 520 is broadcast according to a legacy procedure, an eNB notifies UE devices of the SI update, at the m$^{th}$ MP 515, using a paging, as indicated by reference number 510.

Since UE employing the eDRX is not PHF during a corresponding period of time, it does not receive a paging and does not determine whether SI is updated. To resolve this problem, the eNB sequentially receives SIB1 and MIB, in the PHF 500, after the SI is updated, and determines whether systemInfoValueTag value included in the SIB1 is identical to the systemInfoValueTag value stored in the UE, as indicated by reference number 530.

When the systemInfoValueTag value included in the newly received SIB1 is not identical to the systemInfoValueTag value stored in the UE, UE considers that SI update occurred in an interval not the PHF and updates system information as currently broadcast system information. The systemInfoValueTag can be re-used by eDRX UE. New systemInfoValueTagExt for additional eDRX UE can be defined.

The systemInfoValueTag has a value of INTEGER, 0, . . . , 31. That is, the systemInfoValueTag has a value from 0 to 31 and increases by one each time SI is updated. When the value exceeds 31, the systemInfoValueTag returns to 0. The systemInfoValueTagExt has a value of INTEGER, 0, . . . , 256. This is designed because eDRX can have a relatively long duration of a DRX cycle during which SI can be updated a number of times. The systemInfoValueTagExt may also increase by one each time SI is updated. Another plan is that: when the value is wrapped around, with the re-uses of the systemInfoValueTag value, the systemInfoValueTagExt value increases by one. This plan may set the systemInfoValueTagExt value to have a relatively lower range of integer value, e.g., INTEGER, 0, . . . , 15, and the like, than the previous plan has set. When SI update occurs during the PHF, an indicator notifying the SI update occurrence is included in a paging message for eDRX UE and new system information can be updated from and after the next MP in the same as an legacy method.

Figure 6:
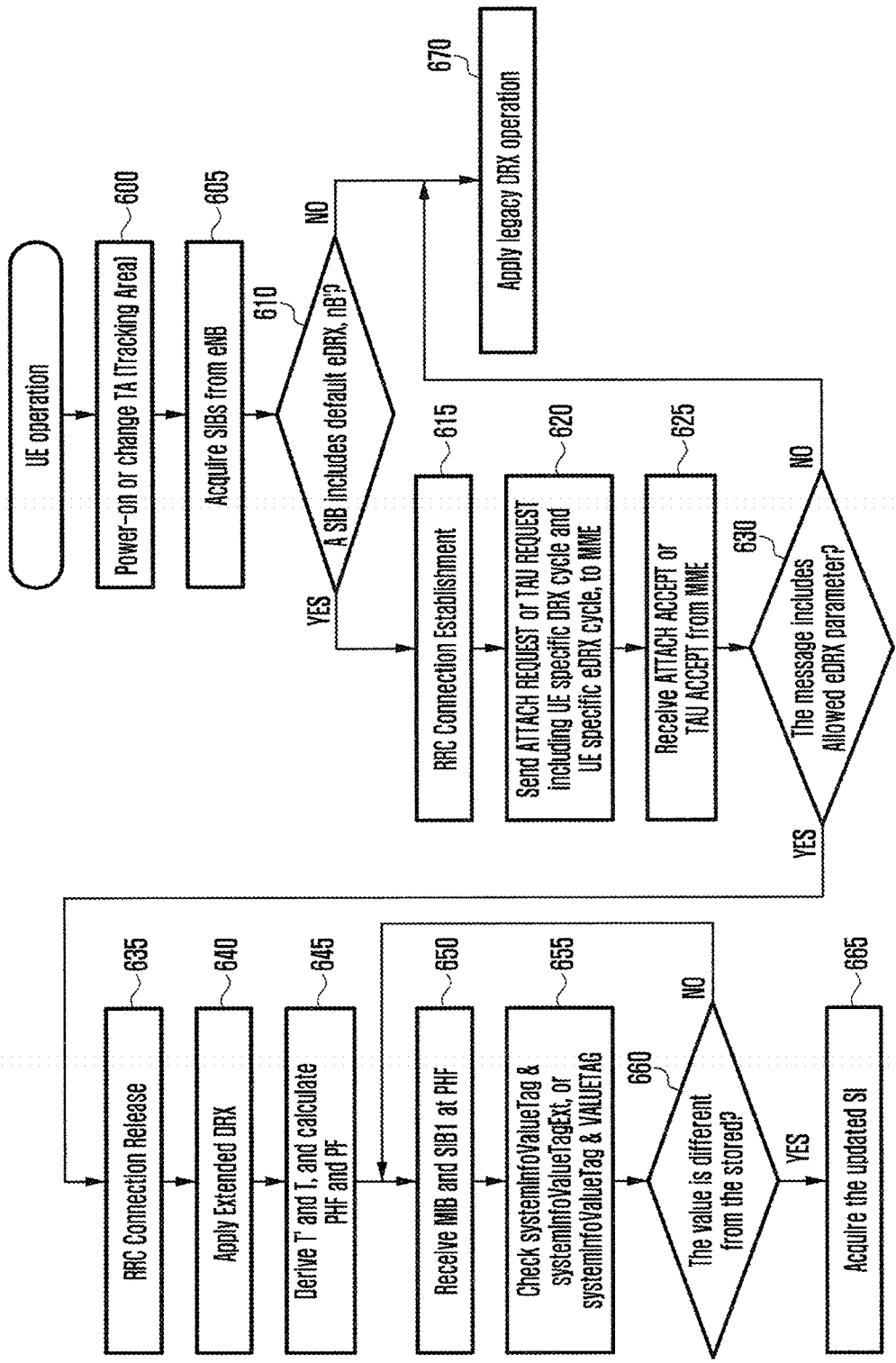
FIG. 6 is a flowchart that describes that describes a method for user equipment (UE) to check altered system information using SIB1 according to the present disclosure.

FIG. 6 is a flowchart that describes a method for user equipment (UE) to check altered system information using SIB1 according to the present disclosure.

UE is powered on or changes the Tracking Area (TA) in operation 600. The UE acquires system information from an eNB in operation 605. The UE determines whether the system information includes a default eDRX cycle and an nB' value in operation 610.

When the UE ascertains that the system information includes a default eDRX cycle and an nB' value in operation 610, it performs RRC Connection Establishment in operation 615. When the UE prefers to apply the eDRX, it sends, to an MME, ATTACH REQUEST or TAU REQUEST message including a UE specific DRX cycle and a UE specific eDRX cycle in operation 620.

The UE receives a message, ATTACH ACCEPT or TAU ACCEPT, from the MME in operation 625. The UE determines whether the message includes an Allowed eDRX parameter in operation 630. The Allowed eDRX parameter can include an indication or a condition as to whether the MME supports the eDRX and information regarding an eDRX cycle that the UE needs to employ.

The UE performs a process, RRC Connection Release, in operation 635. The UE applies eDRX in operation 640. To this end, the UE derives T' and T and calculates PHF and PF, using the equations described above in operation 645. The operation can be performed before performing the RRC Connection Release. When the calculated PHF arrives, the UE sequentially receives MIB and SIB1 in operation 650. The UE checks systemInfoValueTag or systemInfoValueTagExt value in the SIB1 in operation 655. The eDRX UE receives an SIB1 at least once every T', i.e., an eDRX cycle, and checks systemInfoValueTag or systemInfoValueTagExt in the received SIB1.

When the UE performs the DRX operation at an eDRX cycle, it can receive SIB1 closest, in the domain closest, to the first PF/PO of the PHF determined according to the eDRX cycle. Alternatively, the UE can receive SIB1 closest to the first PF/PO of the PHF, from among SIB1s created later (or earlier) than the first PF/PO of the PHF.

The UE determines whether its storing value differs from values of the IEs in operation 660. When the UE ascertains that its storing value does not differ from values of the IEs in operation 660, it does not need to update system information. On the other hand, when the UE ascertains that its storing value differs from values of the IEs in operation 660, it receives system information that an eNB is currently broadcasting in operation 665.

Meanwhile, when the eNB does not broadcast a default eDRX and nB' in operation 610 or the MME does not send an Allowed eDRX parameter in operation 630, the UE performs only a legacy DRX operation in operation 670.

Although the embodiment referring to FIG. 6 describes UE in an idle mode, it should be understood that the present disclosure can also be applied to UE in a connection state (mode). UE in a connection state (mode) can perform the DRX, and also set to operate in a long DRX cycle and a short DRX cycle. The UE applies a short DRX cycle during the transmission/reception of data and a long DRX cycle while not performing the transmission/reception of data.

A long DRX cycle can be set to 10 ms-10.24 sec and greater than a modification period. UE in a connection state is capable of checking SIB1 as described below.

UE establishes RRC connection with an eNB. UE reports a condition as to whether it supports eDRX to the eNB. The eNB can set a relatively long DRX cycle, e.g., 10.24 seconds, for UE capable of supporting eDRX. The UE performs a first or second operation based on the set length of DRX cycle.

When the set length of long DRX cycle is a first value, the UE performs a first operation. When the set length of long DRX cycle is greater than or equal to the first value, the UE performs a second operation. The first value can be a fixed value, e.g., 2.56 seconds. Alternatively, the first value can be specific values set according to cells, e.g., a length of modification period.

The first operation is as follows. UE checks SIB1 at least once every modification period and determines whether SI is altered. UE can check the first SIB1 of the modification period and determine whether SI is altered. When UE ascertains that SI is altered, i.e., when UE ascertains that a value tag differs from the value stored therein, it receives SIBs again and replaces its currently stored values with the received SIBs.

The second operation is as follows. UE checks SIB1 at least once during every period which has a larger value than the other out of a modification period and a long DRX cycle, and determines whether SI is altered. For example, when UE determines to check SIB1 at a Long DRX cycle, it can check SIB closest, in time, to onDuration. When UE ascertains that SI is altered, i.e., when UE ascertains that a value tag differs from the value stored therein, it receives SIBs again and replaces its currently stored values with the received SIBs.

Figure 7:
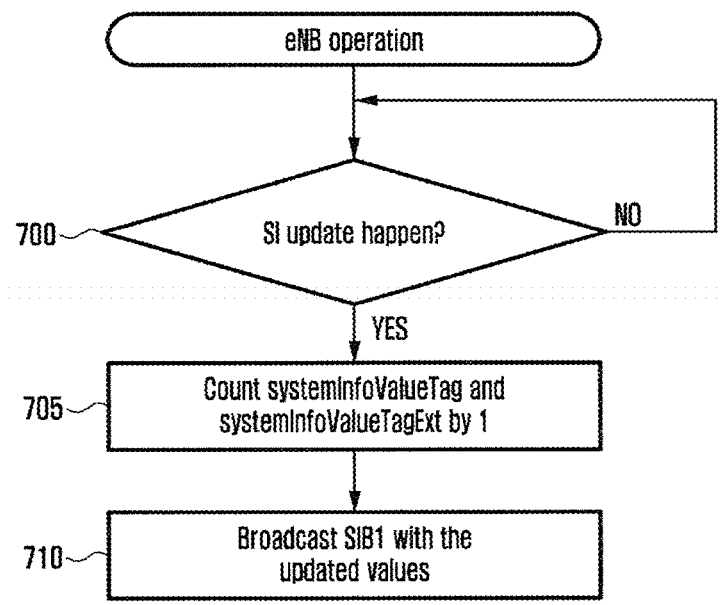
FIG. 7 is a flowchart that describes that describes a method for eNB to notify altered system information using SIB1 according to the present disclosure.

FIG. 7 illustrates an example operation for eNB to notify altered system information using SIB1 according to the present disclosure.

The eNB determines whether system information is updated in operation 700. When the eNB ascertains that system information is updated in operation 700, it increases the count of systemInfoValueTag value and the count of systemInfoValueTagExt by one in operation 705. Alternatively, when the eNB increases the count of systemInfoValueTag value by one and then ascertains that wrap around occurs, it can increase the count of systemInfoValueTagExt by one. The eNB includes the updated IEs in SIB1 and broadcasts the SIB1 in operation 710.

Updating system information using a paging message and a value tag is performed only when the down link channel between the UE and the eNB is in a favorable condition. When the down link channel between the UE and the eNB has been in a condition impossible to perform the reception for a relatively long period of time, the UE cannot determine whether a value tag of system information, received after restoring the down link, has been re-used. For example, when UE re-enters an area where it is possible to receive service after it has been in an area where it is impossible to receive service for a few hours, and re-acquires a value tag, the re-acquired value tag can be identical to the value tag that the UE received before, and this result can suggest two possibilities. One is a case where the system information is maintained and thus the two value tags are identical to each other. The other is a case where, although the value tag that the UE had received is identical to the value tag that the UE re-receives, since wrap around occurs, system information can actually differ.

In order to resolve these problems, the present disclosure defines a validity timer for system information. When a specific event occurs, UE starts the validity timer, or resets a validity timer that has been operating to the initial value and re-starts the validity timer. When the time expires, the UE ascertains that the specific event does not occur during the time interval specified by the timer, the UE determines that SI no longer is valid and acquires SI. Examples of the event are the reception of SI by UE, the reception of a value tag identical to that stored in UE, etc.

It is preferable that the validity timer has different values that vary according to DRX cycles of UE. UE which needs to minimize battery power consumption is set to have a relatively long DRX cycle. When UE which needs to minimize battery power consumption is set to have a relatively short time interval of validity timer, it can increase the ratio of battery power consumption to the overall battery power consumption when re-acquiring system information (SI). On the other hand, when UE has a relatively short DRX cycle, it can consume a relatively small amount of battery power when re-acquiring system information (SI), compared with the overall battery power consumption. Therefore, although the UE with a relatively short DRX cycle is set to have a relatively short time interval of validity timer, it does not cause any issues.

It is preferable that the validity timer has different values varying according to lengths of valueTag. For example, the shorter the length of valueTag, the higher the probability that the valueTag is wrapped around. Therefore, it is preferable that the time interval of a validity timer is relatively small. In contrast, it can also be possible that the longer the length of valueTag the larger the length of the validity timer.

The present disclosure enables UE to properly employ the length of the validity timer, according to the length/type of a value tag, broadcast via system information and the length of DRX cycle set to UE.

Figure 8:
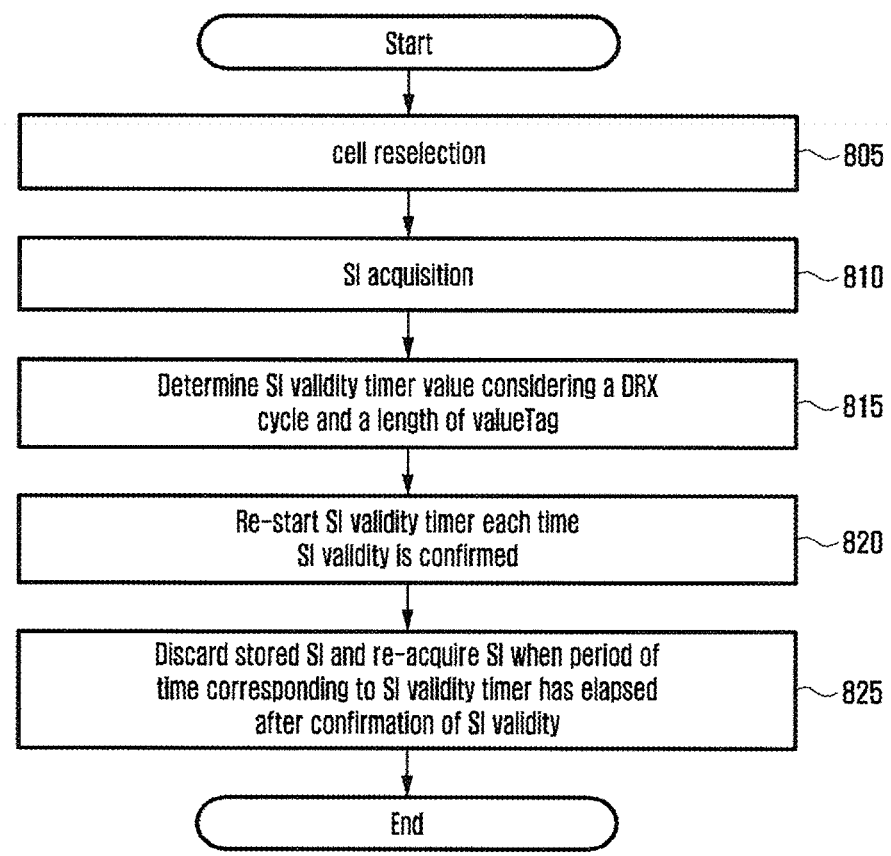
FIG. 8 is a flowchart that describes a method for UE to manage stored system information using system information and a valid period timer according to the present disclosure.

FIG. 8 is a flowchart that describes a method for UE to manage stored system information using system information and a valid period timer according to the present disclosure.

UE performs the cell re-selection in operation 805. The cell re-selection refers to the change in serving cells by UE. In particular, the cell re-selection means that, from among the cells allowing UE to camp-on, including a current serving cell, UE camps on a cell satisfying a specific condition such as a condition that it has the highest level of down link signal intensity or the highest level of down link signal quality.

After performing the cell re-selection, UE acquires system information from a new serving cell as follows in operation 810.

Reception of MIB in a frequency range corresponding to 6 PRB at the system center frequency
Acquisition of SFN information, etc.
  Acquisition of SIB1 via subframe 5 of a radio frame satisfying SFN mod 8=0
PLMN ID, cell ID, Tracking Area Code, and the like.
  systemInfoValueTag: a value between 0~31. The maximum value is 31.
  systemInfoValueTagExt (optional)
    Broadcast from only eNB supporting eDRX
    independently have a meaning but can have a meaning cooperating with systemInfoValueTag
    In case of having a meaning independently,
      The minimum value is 0. The maximum value is greater than that of the systemInfoValueTag (e.g., 255).
        commonly applied to SI except for SI related to ETWS/CMAS or SFN, i.e., the remaining SI; even when any one of the remaining SI is altered, the count increases by one
    In case of having a meaning, cooperating with systemInfoValueTag
      The minimum value is 0. The maximum value is an integer.
        when systemInfoValueTag is wrapped around from the maximum value to 0, it increases by 1.
  SchedulingInfo
    Scheduling information regarding SIB 2~SIB 17
  receive and store the remaining SI, based on SchedulingInfo UE stores the received SI as well as systemInfoValueTag and systemInfoValueTagExt.

UE determines the time interval of the validity timer, considering a condition as to whether systemInfoValueTagExt is received and a DRX cycle in operation 815.

Method 1 considering a DRX cycle
  When a cycle employed by UE belongs to a general DRX cycle, i.e., when a cycle is less than or equal to 2.56 seconds or T' is not employed, the time interval of validity timer is set to a first period.
  When a cycle employed by UE belongs to an eDRX cycle, i.e., when a cycle is greater than or equal to 2.56 seconds or T' is employed, the time interval of validity timer is set to a second period.
  The first and second periods are preset values. The second period is greater than the first period.

Method 2 considering a DRX cycle
  When a default eDRX cycle is not broadcast via system information, the time interval of validity timer is set to a first period.
  When a default eDRX cycle is broadcast via system information, the time interval of validity timer is set to a second period.
  The first and second periods are preset values. The second period is greater than the first period.

Method considering systemInfoValueTagExt
  When systemInfoValueTagExt is not broadcast via system information, the time interval of validity timer is set to a first period.
  When systemInfoValueTagExt is broadcast via system information, the time interval of validity timer is set to a second period.
  The first and second periods are preset values. The second period is greater than the first period.

Method of using the maximum value of Value tag
  When the maximum value of the Value tag is a first integer (e.g., 31), i.e., when the maximum value of the Value tag is the maximum value of the systemInfoValueTag, the length of a validity time interval is set to the first period.
  When the maximum value of the Value tag is a second integer (e.g., 255), i.e., when the maximum value of the Value tag is the maximum value of the systemInfoValueTagExt, the length of a validity time interval is set to the second period. ■ The first and second periods are preset values. The second period is greater than the first period.

UE receives SI and then starts the validity timer. When the validity timer reaches the validity time interval as determined above, UE determined that the validity timer has expired.

Each time that the validity of the currently stored SI is confirmed, UE resets the validity timer in operation to zero and then re-starts it in operation 820. Confirming the validity of the currently stored SI refers to the following cases.

Validity confirmation by the reception of SystemInformationBlockType1
  In case of broadcasting only systemInfoValueTag, without broadcasting systemInfoValueTagExt from a corresponding cell
    When stored systemInfoValueTag is identical to received systemInfoValueTag, the validity of the stored SI is confirmed.
  In case of broadcasting systemInfoValueTagExt and systemInfoValueTag from a corresponding cell
    A case that systemInfoValueTagExt has an independent meaning
      When store systemInfoValueTagExt is identical to received systemInfoValueTagExt, the validity of store SI is confirmed.
    A case that systemInfoValueTagExt has an independent meaning
      When stored systemInfoValueTagExt is identical to received systemInfoValueTagExt, and stored systemInfoValueTag is identical to received systemInfoValueTag, the validity of store SI is confirmed.

The confirmation of System Information (SI) by the re-reception of all SI
  When stored systemInfoValueTagExt/systemInfoValueTag is not identical to received systemInfoValueTagExt/systemInfoValueTag, UE discards the stored SI and newly receives SI.
  UE considers that the validity of the newly received SI has been confirmed.

When a preset period of time has elapsed after the validity of stored SI was confirmed, UE considers that the stored SI no longer is not valid. In this case, UE discards the stored SI and then newly re-acquires SI in operation 825. The preset period of time is the validity time interval determined in operation 815, i.e., a first period or a second period. When UE moves to a new cell or the alteration of related system information (e.g., a condition as to whether systemInfoValueTagExt is transmitted or a condition as to whether an eDRX cycle is transmitted) does not occur, the UE continues employing the selected validity time interval.

The method and apparatus according to embodiments of the present disclosure is capable of efficiently managing system information, using a valid period timer, in discontinuous reception mode, in a mobile communication system.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A method for acquiring system information by a user equipment (UE) in a wireless communication system, the method comprising:
   receiving, from a base station, system information including a system information value tag;
   verifying whether stored system information remains valid by checking the system information value tag; and
   determining the stored system information to be invalid after a specific time from a moment that the stored system information was confirmed as valid,
   wherein the specific time is determined based on whether validity time information associated with a system information validity timer is included in the system information.

2. The method of claim 1,
   wherein the moment that the stored system information was confirmed as valid is a moment that the system information value tag is determined to be a same as a value tag of the stored system information.

3. The method of claim 2, further comprising:
   determining the specific time as a first time when the validity time information is included in the system information.

4. The method of claim 2, further comprising:
   determining the specific time as a second time when the validity time information is not included in the system information.

5. The method of claim 1, further comprising:
   discarding the stored system information after determining the stored system information to be invalid; and
   receiving, from the base station, new system information.

6. A method for providing system information by a base station in a wireless communication system, the method comprising:
   generating system information, wherein the system information includes a system information value tag to verify whether stored system information in a user equipment (UE) remains valid; and
   transmitting, to the UE, the system information,
   wherein a specific time is determined based on whether the system information includes validity time information associated with a system information validity timer, and
   wherein the system information is used for determining to be invalid after the specific time from a moment that the stored system information was confirmed as valid.

7. The method of claim 6,
   wherein the moment that the stored system information was confirmed as valid is a moment that the system information value tag is determined to be a same as a value tag of the stored system information.

8. The method of claim 7, wherein the specific time is determined as a first time, in case that the validity time information is included in the system information.

9. The method of claim 7, wherein the specific time is determined as a second time, in case that the validity time information is not included in the system information.

10. The method of claim 6, further comprising:
    transmitting, to the UE, new system information,
    wherein the new system information is acquired by the UE after the stored system information is determined to be invalid.

11. A user equipment (UE) for acquiring system information in a wireless communication system, the UE comprising:
    a transceiver; and
    a controller configured to:
      receive, from a base station via the transceiver, system information including a system information value tag,
      verify whether stored system information remains valid by checking the system information value tag, and
      determine the stored system information to be invalid after a specific time from a moment that the stored system information was confirmed as valid,
    wherein the specific time is determined based on whether validity time information associated with a system information validity timer is included in the system information.

12. The UE of claim 11, wherein the moment that the stored system information was confirmed as valid is a moment that the system information value tag is determined to be a same as a value tag of the stored system information.

13. The UE of claim 12, wherein the controller is configured to:
    determine the specific time as a first time when the validity time information is included in the system information.

14. The UE of claim 12, wherein the controller is configured to:
    determine the specific time as a second time when the validity time information is not included in the system information.

15. The UE of claim 11, wherein the controller is configured to:
    discard the stored system information after determining the stored system information to be invalid, and
    receive, from the base station via the transceiver, new system information.

16. A base station for providing system information in a wireless communication system, the base station comprising:
    a transceiver; and
    a controller configured to:
      generate system information, wherein the system information includes a system information value tag to verify whether stored system information in a user equipment (UE) remains valid, and
      transmit, to the UE via the transceiver, the system information, wherein a specific time is determined based on whether the system information includes validity time information associated with a system information validity timer, and wherein the system information is used for determining to be invalid after the specific time from a moment that the stored system information was confirmed as valid.

17. The base station of claim 16, wherein the moment that the stored system information was confirmed as valid is a moment that the system information value tag is determined to be a same as a value tag of the stored system information.

18. The base station of claim 17, wherein the specific time is determined as a first time in case that the validity time information is included in the system information.

19. The base station of claim 17, wherein the specific time is determined as a second time in case that the validity time information is not included in the system information.

20. The base station of claim 16, wherein the controller is configured to transmit, to the UE via the transceiver, new system information, and wherein the new system information is acquired by the UE after the stored system information is determined to be invalid.

* * * * *